May 25, 1943.　　　G. A. LYON　　　2,319,936
FENDER SCUFF PLATE
Filed Aug. 8, 1941
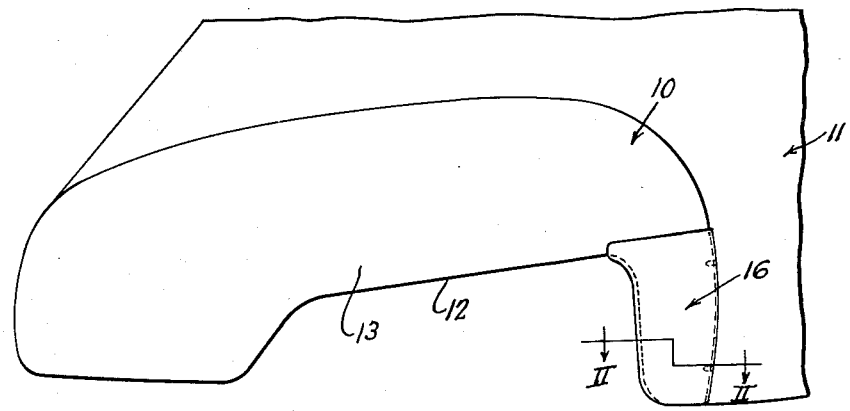
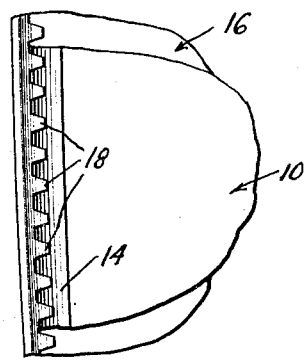
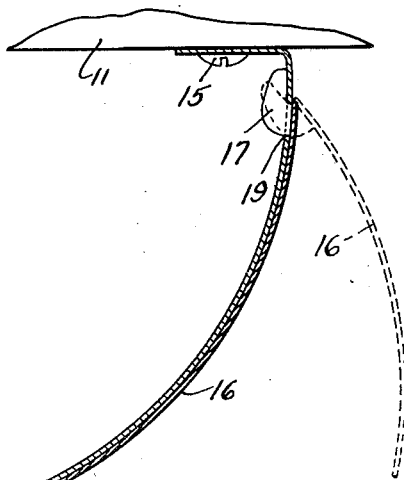
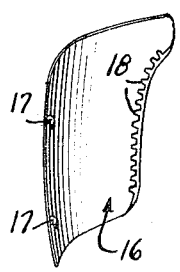
Inventor
GEORGE ALBERT LYON.

Patented May 25, 1943

2,319,936

UNITED STATES PATENT OFFICE 2,319,936

FENDER SCUFF PLATE

George Albert Lyon, Allenhurst, N. J., assignor to Lyon Incorporated, Detroit, Mich., a corporation of Delaware Application August 8, 1941, Serial No. 405,929

7 Claims. (Cl. 280—153)

This invention relates to fender scuff plates, and more particularly to a scuff plate or protective shield for the leading face of a fender, and to a novel means for securing the same on the fender.

Vehicles employing fenders, and particularly automotive vehicles of the present day, commonly employ a fender of the so-called "high crowned" type. These fenders have a deep rolling crown portion and an extensive depending side wall portion in which a relatively large opening is provided for removal and replacement of the vehicle wheel. Fenders of this type, as is readily understood by those skilled in the art, are subjected to flying particles, stones and other foreign material when the vehicle is in motion, the majority of which strike the fender in the region of the lower front wall portion or the lower side wall portion forward of the wheel opening. It has been found desirable in practice to provide some sort of a shield in this region to prevent indentation and marring of the fender.

It is an object of the present invention to provide a fender scuff plate, or protective shield, for a vehicle fender and to a novel method and means for securing the same thereon.

Another object of the present invention is to provide a novel sheet metal fender scuff plate.

A further object of the present invention is to provide a fender scuff plate having novel means thereon including hook means at one end and resilient fingers at the other end for securing the same to a vehicle fender.

Another and further object of the present invention is to provide a fender scuff plate, or protective shield, which is arranged to be snugly wrapped around the lower front portion of a vehicle fender and which may also be provided with one or more fingers thereon which make a sliding engagement with the vehicle fender thereby to permanently hold the scuff plate thereon.

The novel features which I believe to be characteristic of my invention are set forth with particularity in the appended claims. My invention itself, both as to its organization and manner of construction and method of operation, together with further objects and advantages thereof, may best be understood by reference to the accompanying drawing, in which:

Figure 1 is a side elevational view of a vehicle fender having a fender scuff plate thereon;

Figure 2 is a horizontal sectional view through the fender scuff plate and the forward portion of the vehicle fender as taken along the line II—II of Figure 1;

Figure 3 is a rear view of a fragmentary portion of the rear end of the scuff plate showing the manner in which the teeth thereon make a biting engagement with the rolled edge of the fender; and, Figure 4 is an isometric view of the scuff plate showing the hooks along one edge thereof and a plurality of fingers along another edge thereof.

Referring now to the various figures of the drawing which illustrate one embodiment of the present invention, there is illustrated therein a vehicle fender 10 mounted on a vehicle 11. The fender 10 has a relatively large opening 12 therein which affords access to the vehicle wheel, the opening 12 being located in the downwardly depending side wall portion 13 of the fender 10. The lower or base edges of the fender 10, as well as the edge portions around the opening 12, are rolled or curved inwardly as at 14. This rolled or curved edge 14 stiffens the fender in a manner well known to those skilled in the art. The fender 10 may be secured to the vehicle 11 in any suitable manner, such as by bolts 15 (Figure 2).

The fender scuff plate, or protective shield, 16 is provided for the front end of the fender 10. This scuff plate, or protective shield, 16 is shaped to fit snugly over the curved lower front portion of the fender 10 and is provided at its front end with a pair of vertically spaced L-shaped hooks or fingers 17 and along its curved rear edge with a plurality of resilient fingers 18. The scuff plate 16 is preferably formed of steel or other metal which is slightly resilient and the fingers 18 are preferably formed integral thereon. The fingers 17 may be secured to the scuff plate 16 in any convenient manner.

The fender 10 opposite the L-shaped fingers 17 is provided with apertures 19 through which the L-shaped fingers 17 may be hooked. The fingers 18 are bent at an acute angle with respect to the adjacent body portion of the scuff plate 16 and are so arranged and disposed that they may be sprung over the curved or rolled edge 14 of the fender 10 around the forward portion of the opening 12. Because of the particular angle that the fingers 18 make with respect to the adjacent body portion of the scuff plate 16 and because of their angular relationship with respect to the rolled edge 14 of the fender 10, it will at once be observed from an inspection of Figure 2 that these fingers 18 after they have once been sprung over the rolled edge 14 will make a biting engagement therewith. Any tendency of the rear edge of the scuff plate 16 to become dislodged from the fender will only make the fingers 18 bite deeper into the rolled edge 14.

To mount the scuff plate 16 on the fender 10, the L-shaped hooks are hooked through the openings 19 in the fender 10 with the scuff plate held approximately in the position as shown by the dotted lines in Figure 2. The scuff plate 16 is thereafter rocked about the fingers 17 which provide a substantially vertical axis of rotation until the fingers engage the rolled edge 14 in the manner shown in Figure 2. The scuff plate 16 is now substantially permanently secured to the fender 10.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. The combination with a wheel fender having an outer side wall and a curved forward wall which gradually merges into said side wall, said side wall having a wheel opening therein, of a scuff plate of slightly resilient sheet metal material arranged to extend over a portion of the forward wall and around over an adjacent portion of the side wall, said scuff plate being formed to snap into engagement with said fender, and having supporting and securing means including concealed resilient fingers for yieldably retaining it in engagement with said fender and which fingers are rendered effective by the act of shoving said plate into position on said fender so that said plate is resiliently retained in place by said fingers.

2. The combination with a wheel fender having a wheel opening, of a scuff plate of relatively stiff sheet material formed to be snapped into engagement over a portion of said fender adjacent and extending away from the wheel opening, and having hook means at one end thereof for supporting said plate for swinging movement on said fender and for retaining said plate in position on said fender, and concealed resilient fingers at the other end for yieldably retaining it in engagement with said fender and which fingers are rendered effective by the act of shoving said plate into position on said fender so that said plate is resiliently retained in place by said fingers.

3. The combination with a wheel fender having a wheel opening in a side wall thereof and having a rounded forward wall, of a scuff plate of sheet metal material for extending over a portion of said side wall adjacent the wheel opening and extending around over the forward wall, thereby providing a protective plate for said fender against flying stones and other foreign objects, hook means adjacent one end of said scuff plate arranged to be hooked onto said fender, and spaced fingers at the other end bent back behind said scuff plate and disposed at an angle to project toward said scuff plate, said fingers being positioned to make a biting engagement with said fender when said plate is shoved into position thereon.

4. In a crowned fender construction including a curved front and an apertured side wall, a fender scuff plate for disposition over the curved front and around to the aperture in the side wall, said plate having hook means for cooperation with the fender front and means for making a biting engagement with the fender adjacent the aperture.

5. In a crowned fender construction including a curved front and an apertured side wall, a fender scuff plate for disposition over the curved front and around the side wall to the aperture therein, said plate having hook means for cooperation with the fender front and being held on the fender side wall as well as over the front solely by a snap-on connection.

6. In a crowned fender construction including a curved front and an apertured side wall, a fender scuff plate for disposition over the curved front and around the apertured side wall, means at one end of said plate for pivotally mounting said plate on said fender for movement about substantially a vertical axis, and means spaced from said first means including a plurality of resilient fingers for making a snap-on biting engagement with the fender.

7. In a crowned fender construction including a curved front and an apertured side wall, a fender scuff plate for disposition over the curved front and around the side wall to the aperture therein, means in proximity to the front edge of said scuff plate for pivotally supporting said plate on said fender for movement toward and away from said fender, and a plurality of obliquely forwardly and outwardly extending fingers along the rear edge of said scuff plate for making a biting snap-on engagement with the aperture defining edge of said fender.

GEORGE ALBERT LYON.